US011556446B2

(12) United States Patent
Abrams et al.

(10) Patent No.: US 11,556,446 B2
(45) Date of Patent: Jan. 17, 2023

(54) PROGRAMMATIC PERFORMANCE ANOMALY DETECTION

(71) Applicant: INTERNATIONAL BUSINESS MACHINES CORPORATION, Armonk, NY (US)

(72) Inventors: Robert M. Abrams, Wappingers Falls, NY (US); Karla Arndt, Rochester, MN (US); Friedrich Matthias Gubitz, Heidenheim (DE); Dieter Wellerdiek, Ammerbuch (DE); Nicholas C. Matsakis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 17/032,121

(22) Filed: Sep. 25, 2020

(65) Prior Publication Data

US 2022/0100628 A1 Mar. 31, 2022

(51) Int. Cl.
*G06F 11/34* (2006.01)
*G06F 11/30* (2006.01)
*G06F 11/32* (2006.01)

(52) U.S. Cl.
CPC ...... *G06F 11/3409* (2013.01); *G06F 11/3072* (2013.01); *G06F 11/3089* (2013.01); *G06F 11/327* (2013.01); *G06F 11/3447* (2013.01); *G06F 11/3452* (2013.01)

(58) Field of Classification Search
CPC ............. G06F 11/3409; G06F 11/3447; G06F 11/3452; G06F 11/3089; G06F 11/3466
See application file for complete search history.

(56) References Cited

U.S. PATENT DOCUMENTS

| | | | | |
|---|---|---|---|---|
| 6,230,183 | B1* | 5/2001 | Yocom | G06F 9/5061 718/105 |
| 7,487,506 | B1* | 2/2009 | Bosch | G06F 9/5061 718/104 |
| 8,214,693 | B2 | 7/2012 | Caffrey et al. | |
| 8,250,581 | B1* | 8/2012 | Blanding | G06F 9/5011 718/103 |
| 2007/0156889 | A1* | 7/2007 | Bhrara | G06F 11/0709 709/224 |

(Continued)

FOREIGN PATENT DOCUMENTS

EP 0725339 A2 8/1996

OTHER PUBLICATIONS

Abrams, et al., "Programmatic Performance Anomaly Detection," Application and Drawings, Filed on Aug. 26, 2021, 15 Pages, Related DE Patent Application Serial No. 102021122077.7.
Abrams, et al., "Programmatic Performance Anomaly Detection," Application and Drawings, Filed on Sep. 15, 2021, 22 Pages, Related GB Patent Application Serial No. 2113147.9.
Abrams, et al., "Programmatic Performance Anomaly Detection," Application and Drawings, Filed on Sep. 24, 2021, 18 Pages, Related JP Patent Application Serial No. 2021-155952.

(Continued)

*Primary Examiner* — Yolanda L Wilson
(74) *Attorney, Agent, or Firm* — Teddi E. Maranzano (57) ABSTRACT

A method, system, and computer program product are provided for performance anomaly detection. Velocity data is periodically received from a workload manager for one or more address spaces. An expected velocity value is created for each of the one or more address spaces. A factor of the expected velocity value is compared to a current velocity value from the velocity data. Based on the current velocity value being lower than the factor, a remedial action is generated indicating an anomaly.

15 Claims, 4 Drawing Sheets

(56) References Cited

U.S. PATENT DOCUMENTS

| | | | | |
|---|---|---|---|---|
| 2009/0037922 | A1* | 2/2009 | Herington | G06F 9/505 |
| | | | | 718/104 |
| 2010/0324869 | A1 | 12/2010 | Cherkasova et al. | |
| 2011/0154003 | A1* | 6/2011 | Carrizo | G06F 11/3452 |
| | | | | 713/1 |
| 2012/0311138 | A1* | 12/2012 | Inamdar | H04L 43/04 |
| | | | | 709/224 |
| 2015/0100698 | A1 | 4/2015 | Valbuena | |
| 2017/0214588 | A1* | 7/2017 | Murthy | H04L 43/0876 |
| 2019/0386889 | A1 | 12/2019 | Noorshams et al. | |
| 2020/0050530 | A1* | 2/2020 | Orth | G06F 11/3419 |
| 2020/0174873 | A1* | 6/2020 | Toupal | G06F 13/4063 |

OTHER PUBLICATIONS

Abrams, et al., "Programmatic Performance Anomaly Detection," Application and Drawings, Filed on Sep. 24, 2021, 19 Pages, Related CN Patent Application Serial No. 202111120560.7.

Intellecutal Propoerty Office, "Patents Act 1977: Combined Search and Examination Report under Sections 17 and 18(3)," Patents Directorate, dated Mar. 3, 2022, 6 pages, Application No. GB2113147.9.

Disclosed Anonomously, "Determining "Normal" for a System in Order to Predict the Future", An IP.com Prior Art Database Technical Disclosure, IP.com No. IPCOM000182850D, IP.com Electronic Publication Date: May 7, 2009, 3 pages.

* cited by examiner

PROGRAMMATIC PERFORMANCE ANOMALY DETECTION

BACKGROUND

Embodiments of the invention generally relate to computer systems, and more specifically to performance anomaly detection.

Programmatic performance anomaly detection relates to the analysis of system behavior to determine metric ranges indicating normal behavior vs. ranges indicating abnormal behavior. To reduce the possibility of false positive information, the collection of supporting evidence of anomalous behavior assists in further narrowing down related problem symptoms. However, the identification of such evidence often requires that the system be operating in an anomalous mode to collect valuable data.

SUMMARY

Among other things, a method is provided for performance anomaly detection. Velocity data is periodically received from a workload manager for one or more address spaces. An expected velocity value is created for each of the one or more address spaces. A factor of the expected velocity value is compared to a current velocity value from the velocity data. Based on the current velocity value being lower than the factor, a remedial action is generated indicating an anomaly.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

The present disclosure relates generally to the field of programmatic performance anomaly detection. Program and system anomaly detection analyzes normal program and system behaviors and discovers aberrant executions caused by attacks, misconfigurations, program bugs, and unusual usage patterns.

Anomaly detection includes identifying unexpected items or events in data sets, which differ from the norm. Anomaly detection assumes that anomalies rarely occur in the data, and features of the anomalies differ significantly from the normal instances.

A common approach that IT operations staff uses is to assume everything is operating well until a performance problem occurs. In current practice, several silos of administration tools are used that monitor system behavior and offer drill-downs to determine the underlying symptoms. The nature and complexity of the problem determination may vary based on user background and experience. For example, an experienced administrator may know to execute one tool over another, or to execute a particular series of commands, where a less experienced administrator may not. Operator commands may be used to look for unusual behavior. However, in very high speed computing environments, it is advantageous to integrate performance degradation detection into the process to automatically initiate further analysis of the possible underlying anomalies.

A workload manager (WLM) component of an operating system currently enables a system administrator to define performance goals in service classes. A service class is a named group of work within a workload with the similar performance characteristics of performance goals, resource requirements, and business importance to the enterprise.

This includes metrics indicating average response time, response time within a percentile, velocity goals and goals for discretionary workloads. Velocity is a measure of how fast work should run when ready, without being delayed for system resources. It is defined as a measure of processor activity used to process a workload over time, along with delays that are introduced in support of processing the workload. Delays include operating system processes related to the processor, storage and I/O, including memory paging, page swapping, job creation and initialization delays, etc.

Predictive Failure Analysis (PFA) is an operating system component that collects data, models the collected data to create expected values or rates, and compares the current metric usage to a factor of the expected value or rate to determine if abnormal behavior is occurring. The functionality of the PFA pre-emptively detects damage in address spaces that may result in system outages.

In current practice, the output of the WLM and the output of the PFA are separate. The PFA can collect historical data based on individual address spaces, groups of address spaces, or the entire system. However, the PFA does not collect performance data nor data from the WLM to monitor performance.

Embodiments of the present invention combine the processing of WLM and PFA by allowing PFA to collect WLM velocity data on the granularity of an address space basis, model expected values based on the historical data, and compare the current velocity to a factor of the expected value. This modeled data is used to determine whether an address space is operating normally, or is lower than normal behavior, and thus degraded. The resulting evaluation is then used to determine whether to declare that a performance anomaly is occurring on the system. A determination of a performance anomaly is used to initiate a process that can directly alert the installation's automation product, and/or a systems administrator for immediately addressing the performance anomaly. For example, the installation's automation product may generate a report, and/or a problem ticket, and initiate the collection relevant diagnostic data to further determine problem symptoms.

Embodiments of the present invention will now be described in more detail in connection with the Figures.

Figure 1:
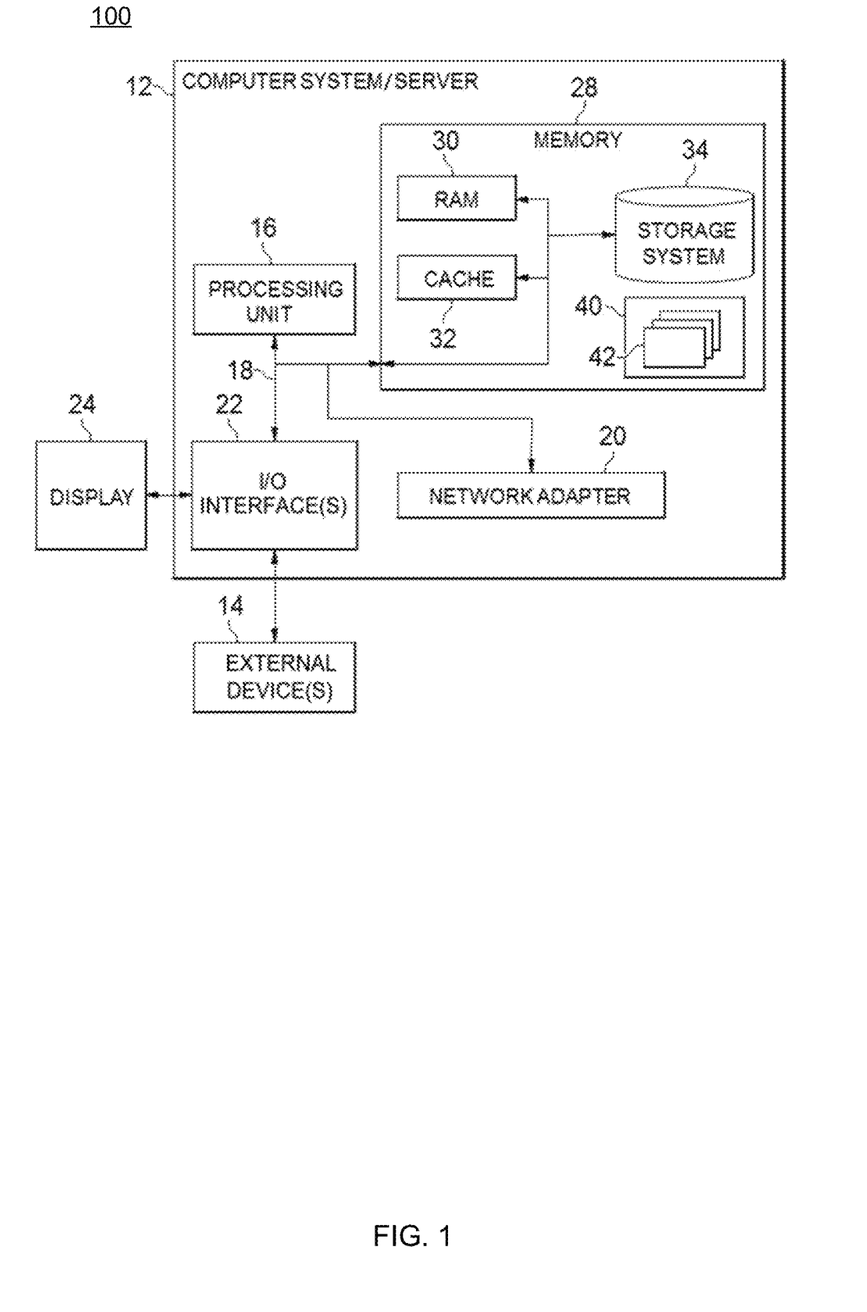
FIG. 1 is a functional block diagram of an illustrative system, according to an embodiment of the present invention.

FIG. 1 is a functional block diagram of a computer system 100. The computer system includes a computer system/server (server) 12 according to an embodiment of the invention. The computer system 100 may include more than one server 12. The server 12 may include any computer capable of executing the functions of hosting and executing a WLM and a PFA; receiving large volumes of log and similar data (e.g., terabytes or more) from the hardware, operating system, and applications; performing statistical analysis on the log and similar data; and modeling the collected data to determine whether an anomaly is occurring on one or more workloads.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, where one or more servers 12 execute tasks, that are linked through a communications network, such as network 13.

As shown in FIG. 1, the server 12 may include, one or more processors or processing units 16, a system memory 28, and a bus 18 that couples various system components including system memory 28 to processing unit 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 represents one of a plurality of programs that are stored in the storage system 34 and are loaded into the memory 28 for execution. A program 40 includes an instance of an operating system, an application, a system utility, or similar. Each program 40 includes one or more modules 42. In the present invention, both the WLM and the PFA are examples of the program 40. Several configurations of the WLM and the PFA are possible. For example, the WLM and the PFA may all reside on the same server 12.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via Input/Output (I/O) interfaces 22. The server 12 can communicate with one or more networks, such as network 13, via network adapter 20. As depicted, network adapter 20 communicates with the other components of the server 12 via bus 18. Although not shown, other hardware and/or software components could be used in conjunction with the server 12. Examples, include, but are not limited to: microcode, device drivers, redundant processing units, external disk drive arrays, RAID systems, tape drives, and data archival storage systems, etc.

Figure 2:
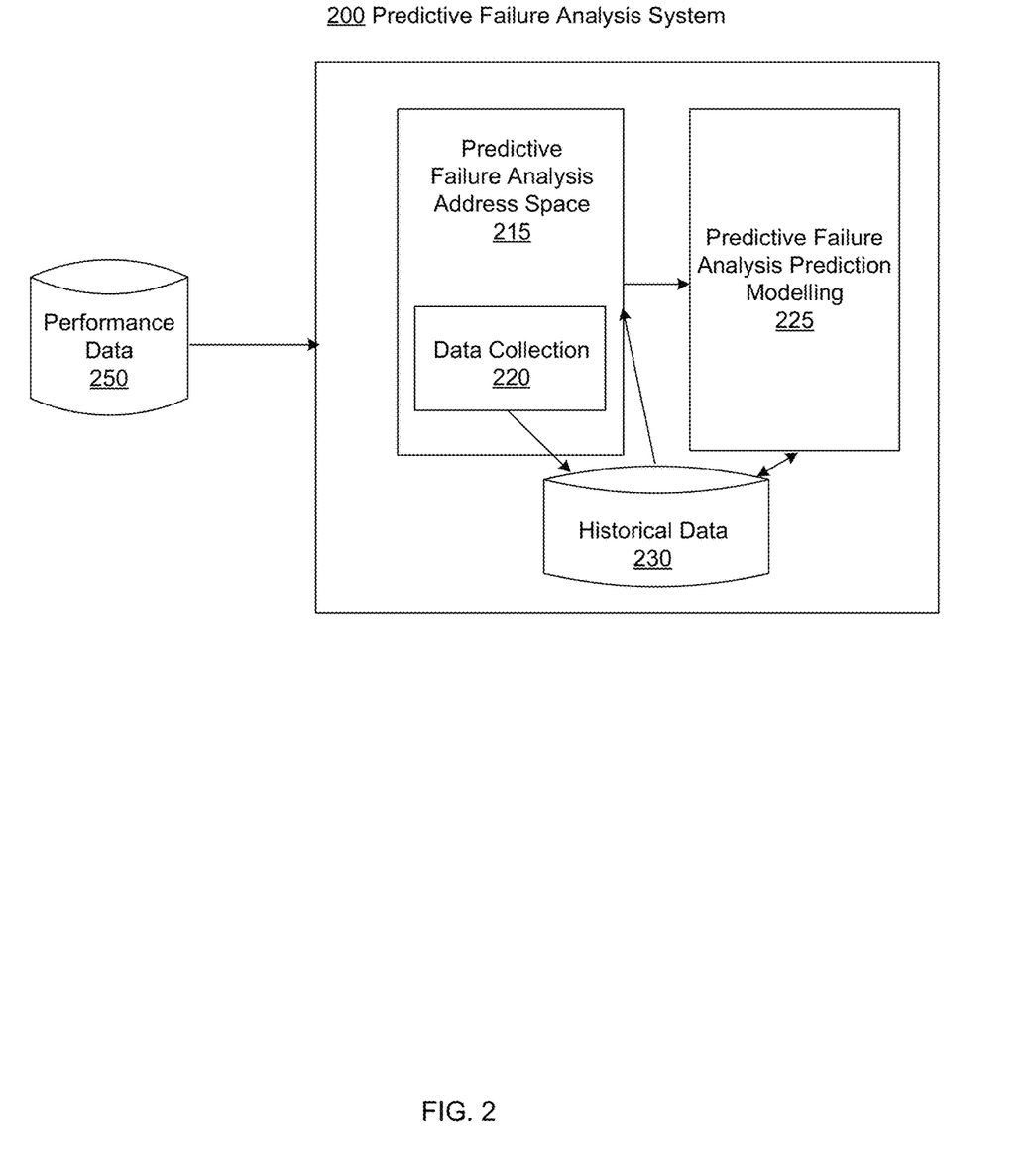
FIG. 2 depicts a predictive failure analysis system, according to embodiments of the present invention.

FIG. 2 depicts a predictive failure analysis system (PFA system) 200 that can be implemented on the computer system 100 of FIG. 1, according to embodiments of the present invention.

The predictive failure analysis address space (PFA address space) 215 of the PFA system 200 receives raw performance data 250 from the WLM in real or near real time, or in batch. The frequency of the raw performance data 250 collection can be configured. For example, by default the collection occurs every minute, but may be configured differently. The received performance data 250 is stored in the data collection 220 for further processing.

Additional configurable parameters include a minimum required number of minutes that an address space is activated (uptime) before PFA collects historical data. This avoids collecting data for address spaces that are transient or short-running. The default is sixty minutes. If an address space ends and is restarted, the address space is considered a new job and the minimum uptime must be satisfied. The data from the address space of the same name is not used in modeling the newly activated address space. Multiple address spaces having the same name will be collected separately using the key of name/address space identifier/start time. An address space that starts within the first hour following IPL of the server does not need to wait before being collected. However, that address space will need to be active for one full collection interval before being collected.

A categories configurable parameter can be used to define which categories of address spaces will be collected. Specifying a lower category automatically includes the higher category. For example, if IMPORTANT is specified, both CRITICAL and IMPORTANT categories are collected.

A CRITICAL address space is one identified with critical system work and infrastructure, e.g., system tasks. An IMPORTANT address space includes CRITICAL address spaces plus critical middleware servers defined as highly important. A NORMAL address includes CRITICAL and IMPORTANT address spaces, plus normal work. Normal work includes applications and services that are non-servers, By using the default of IMPORTANT, server-type address spaces will be included in the collection as long as they satisfy the uptime requirements and are not specifically excluded from the collection by a configuration parameter Discretionary work is not an allowed category.

The PFA address space 215 may provide one or more interfaces, such as a GUI, command line, and parameter file, to receive administrative commands to perform actions on the data collection 220. Actions may specify which workload, address space, and/or job data to include or exclude from the WLM data collection. The various actions may further specify which of the data collection 220 to include in the predictive failure analysis prediction modelling (PFA modeling) 225. Additional parameters to control the operation of the PFA address space 215 include parameters to stop/start/modify collection of certain classes of data, to add/delete workloads and address spaces for collection, and to exclude specific jobs from collection. An additional parameter may specify how often to analyze and model the data collection 220. The data collection 220 may be sorted by address space source, date, record type, or other criteria. The data collection 220 is input to the PFA modeling 225, and becomes historical data 230 to update the model. The PFA address space 215 stores the previous one hour, twenty-four hours, and seven days of raw data collection as historical data 230. These periods may be configurable. Previous models may be stored in the historical data 230. The PFA modeling 225 may use machine learning comprising custom algorithms developed by the enterprise executing the PFA system 200. The PFA modeling 225 may take advantage of export application programming interfaces APIs from one or more statistical modelling software packages, such as IBM Watson® Machine Learning to create the model.

Figure 3:
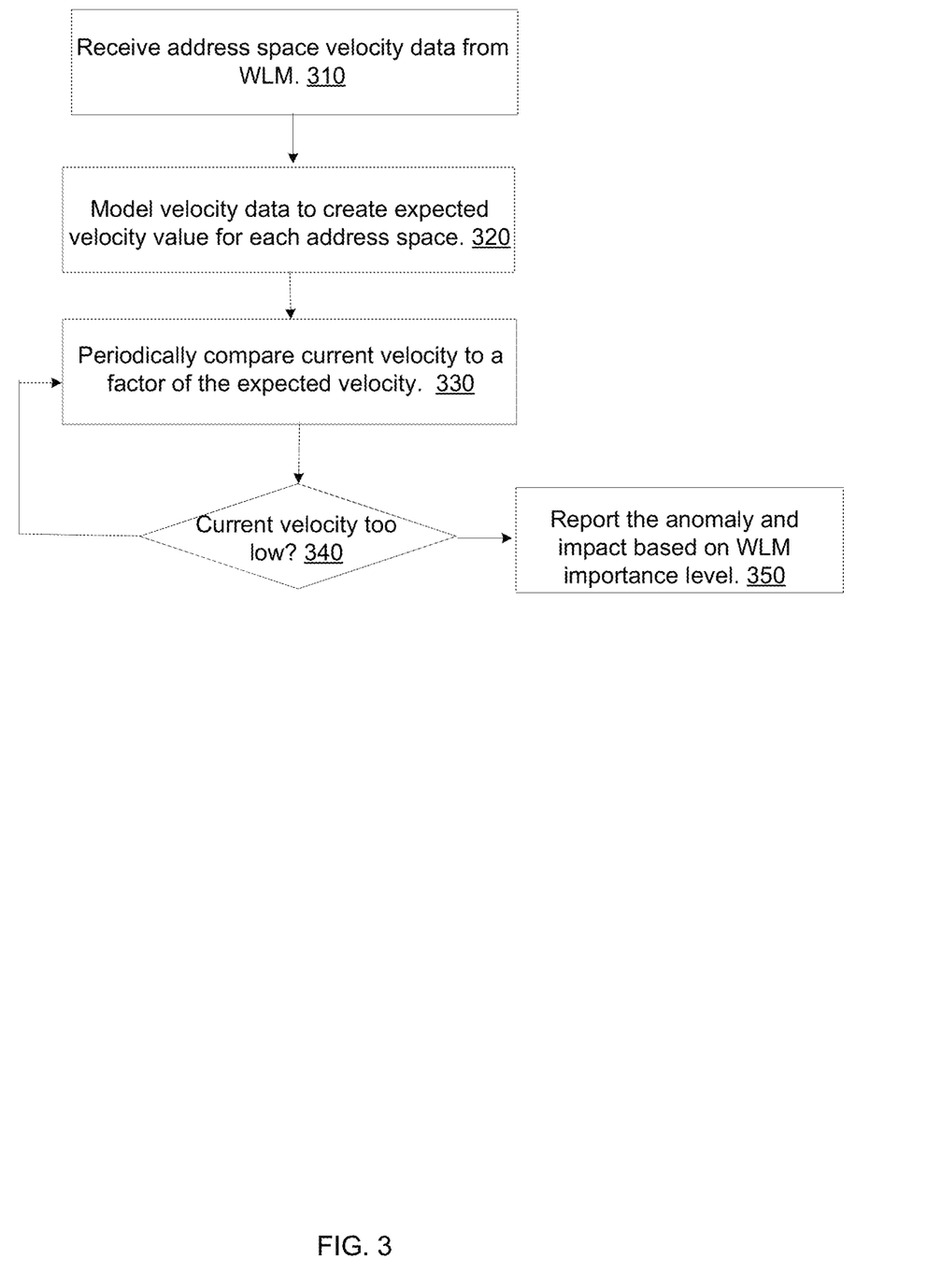
FIG. 3 depicts a workflow of a predictive failure analysis system.

FIG. 3 depicts a workflow of a PFA system 200, according to embodiments of the present invention.

At 310 the PFA address space 215 address space receives velocity data from the WLM. Velocity may be calculated as (using samples*100)/(using samples+delay samples), where using samples include all types of processors using samples (e.g., CPU, memory, cache) and I/O using samples. Delay samples include all types of processor delays, I/O delays, storage delays, and queue delays. Based on these so-called "using" and "delay" samples, the WLM address space velocity is calculated which is a measure of how fast work should run when ready, without being delayed for WLM-managed resources. Velocity is a percentage from "0" to "100". A low velocity value indicates that an address space has few of the resources it needs and is contending with other address spaces for resources. A high velocity value indicates that an address space has all the resources it needs to execute. For example, a "100" indicates that the address space being sampled did not encounter any delays for processor or I/O resources managed by the WLM.

At 320, the PFA address space 215 notifies the PFA modeling 225 to model the velocity data. The modelling results in an expected velocity value for each address space being monitored. The velocity value for each address space is calculated by default every twelve hours. The expected velocity value is calculated for one hour of historical data, twenty-four hours of historical data, and seven days of historical data. These time periods can be configurable.

At 330 the current velocity is compared to a factor, i.e., a percentage, of the expected velocity value.

If, at 340, the comparison indicates the current velocity is too low as compared to the factor of the expected velocity value, at 350, the PFA address space 215 reports the anomaly and impact, based on the WLM importance level settings. An alert is generated that may be input to an automation system for generating problem tickets and IT personnel. The anomaly may also be reported to an operating system component that performs runtime diagnostics. The alert may include an application identifier, such as name or job number, a server identifier, an indicator of the nature of the problem, including any system messages. The importance level indicates how important it is for the workload to meet its performance goal. For example, after a period of data modeling to establish the bounds of normality, if an address space, even one where its WLM service class is meeting its goals, is experiencing a performance problem, it will be detected and alerted before it may have been noticed by an administrator.

Figure 4:
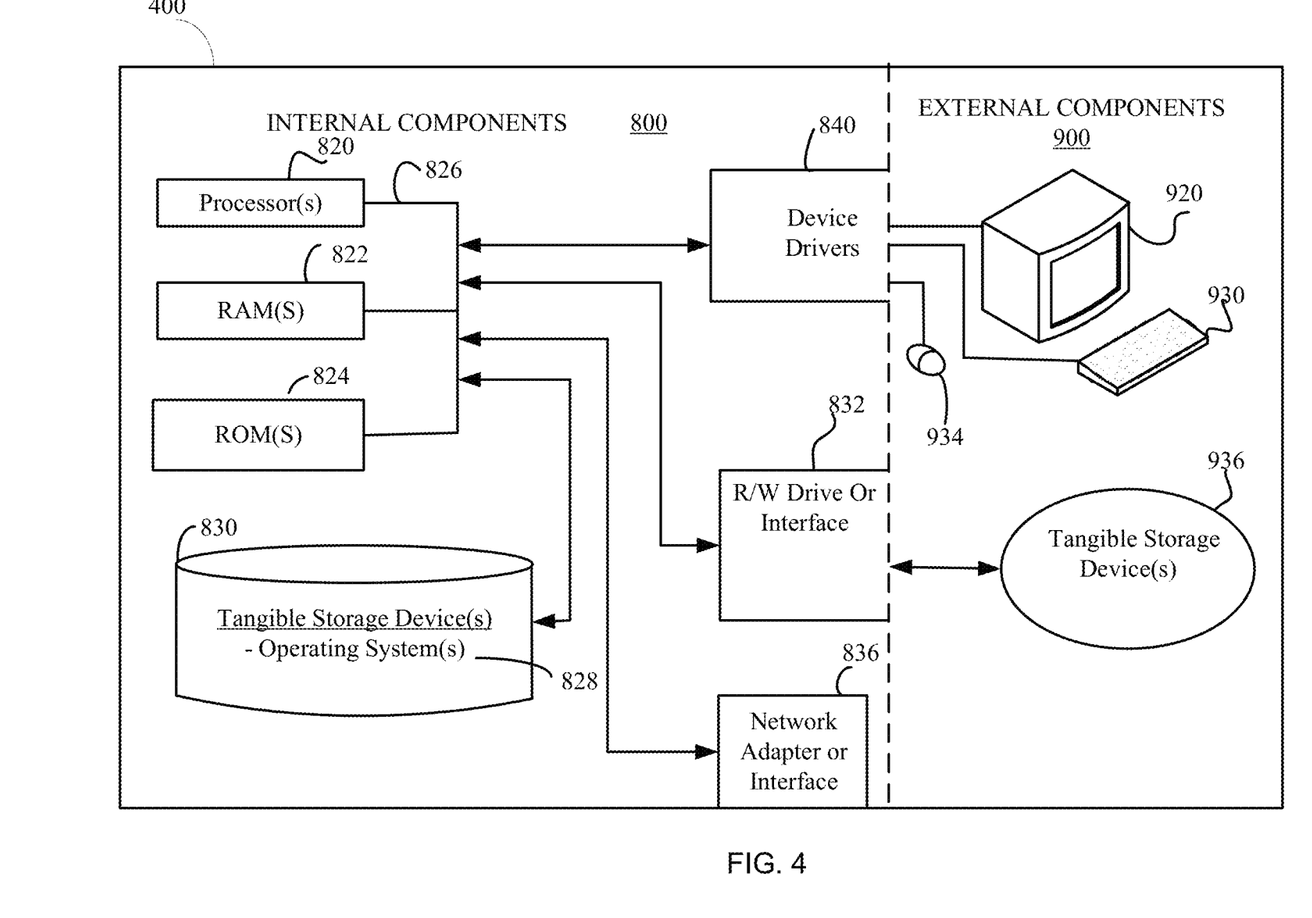
FIG. 4 is an illustrative functional block diagram of a computing device for implementing aspects of the present invention, according to an embodiment of the invention.

FIG. 4 illustrates an exemplary computing device 400 applicable for executing the algorithm of FIG. 3. Computing device 400 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIG. 3; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836.

External components 900 can also include a touch screen 920, keyboard 930, and pointing device 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:
1. A method for programmatic performance anomaly detection, comprising:
 periodically receiving, by a predictive failure analysis component of an operating system, velocity data from a workload manager for one or more address spaces;

modeling expected velocity values for the one or more address spaces based on historical data;
comparing a factor of the expected velocity value to a current velocity value from the received velocity data;
based on the current velocity value being lower than the factor, creating an alert as input to an automation system, wherein the automation system generates problem tickets and notifies Information Technology (IT) personnel; and
updating the model with the received velocity data.

2. The method of claim 1, wherein the current velocity value is calculated as using samples times one-hundred divided by a sum of using samples and delay samples.

3. The method of claim 2, wherein using samples include all types of processor usage, and wherein delay samples include all types of processor delays, I/O delays, storage delays, and queue delays.

4. The method of claim 1, comprising:
inputting the received velocity data and historical data to a statistical modelling software package; and
outputting the expected velocity value.

5. The method of claim 1, further comprising taking a remedial action, wherein the remedial action includes, generating an alert to an automated problem reporting system, wherein the alert includes an application identifier, such as name or job number, a server identifier, an indicator of the nature of the problem, and any system messages.

6. A computer program product for programmatic performance anomaly detection, the computer program product comprising a non-transitory tangible storage device having program code embodied therewith, the program code executable by a processor of a computer to perform a method, the method comprising:
periodically receiving, by a predictive failure analysis component of an operating system, velocity data from a workload manager for one or more address spaces;
modeling expected velocity values for the one or more address spaces based on historical data;
comparing a factor of the expected velocity value to a current velocity value from the received velocity data;
based on the current velocity value being lower than the factor, creating an alert as input to an automation system, wherein the automation system generates problem tickets and notifies Information Technology (IT) personnel; and
updating the model with the received velocity data.

7. The computer program product of claim 6, wherein the current velocity value is calculated as using samples times one-hundred divided by a sum of using samples and delay samples.

8. The computer program product of claim 7, wherein using samples include all types of processor usage, and wherein delay samples include all types of processor delays, I/O delays, storage delays, and queue delays.

9. The computer program product of claim 6, comprising:
inputting the received velocity data and historical data to a statistical modelling software package; and
outputting the expected velocity value.

10. The computer program product of claim 6, further comprising taking a remedial action, wherein the remedial action includes, generating an alert to an automated problem reporting system, wherein the alert includes an application identifier, such as name or job number, a server identifier, an indicator of the nature of the problem, and any system messages.

11. A computer system for programmatic performance anomaly detection, the computer system comprising one or more computer devices each having one or more processors and one or more computer readable storage medium; and a program embodied on at least one of the one or more storage devices, the program having a plurality of program instructions for execution by the one or more processors, the program instructions comprising instructions for: periodically receiving, by a predictive failure analysis component of an operating system, velocity data from a workload manager for one or more address spaces; modeling expected velocity values for the one or more address spaces based on historical data; comparing a factor of the expected velocity value to a current velocity value from the received velocity data; based on the current velocity value being lower than the factor, creating an alert as input to an automation system, wherein the automation system generates problem tickets and notifies Information Technology (IT) personnel; and updating the model with the received velocity data.

12. The computer system of claim 11, wherein the current velocity value is calculated as using samples times one-hundred divided by a sum of using samples and delay samples.

13. The computer system of claim 12, wherein using samples include all types of processor usage, and wherein delay samples include all types of processor delays, I/O delays, storage delays, and queue delays.

14. The computer system of claim 11, wherein creating the expected velocity value further comprises:
inputting the received velocity of the expected velocity and historical data to a statistical modelling software package; and
outputting the expected velocity value.

15. The computer system of claim 11, further comprising taking a remedial action, wherein the remedial action includes, generating an alert to an automated problem reporting system, wherein the alert includes an application identifier, such as name or job number, a server identifier, an indicator of the nature of the problem, and any system messages.

* * * * *